United States Patent [19]

Horneff

[11] 3,836,860

[45] Sept. 17, 1974

[54] MEASURING TEST SIGNALS OF TEST LINES WHICH HAVE PASSED THROUGH AN AMPLIFIER, PARTICULARLY A VIDEO AMPLIFIER

[75] Inventor: Hans Horneff, Darmstadt, Germany

[73] Assignee: Robert Bosch Fernsehanlagen GmbH, Darmstadt, Germany

[22] Filed: May 22, 1972

[21] Appl. No.: 255,340

[52] U.S. Cl. .......................... 330/2, 330/17, 330/20, 330/57

[51] Int. Cl. .......................... H03f 19/00

[58] Field of Search .......................... 330/2, 57

[56] References Cited

UNITED STATES PATENTS

| | | | |
|---|---|---|---|
| 2,961,607 | 11/1960 | Hunt | 330/2 X |
| 3,412,342 | 11/1968 | Tonnessen | 330/76 |
| 3,422,367 | 1/1969 | Koning | 330/51 X |

*Primary Examiner*—Nathan Kaufman
*Attorney, Agent, or Firm*—Littlepage, Quaintance, Murphy & Dobyns

[57] ABSTRACT

Measuring test signals which have passed through a video amplifier having continuously adjusted amplification characteristics during transmission of a video signal. The test signal is fed during a blanking interval of the picture thus transmitted with switching provided to cause selected elements of the amplifier to have nonvariable amplification characteristics during the part of the blanking interval used for testing.

11 Claims, 5 Drawing Figures

MEASURING TEST SIGNALS OF TEST LINES WHICH HAVE PASSED THROUGH AN AMPLIFIER, PARTICULARLY A VIDEO AMPLIFIER

BACKGROUND OF THE INVENTION

The invention relates to a method for measuring test signals on test lines which have passes through a video amplifier whose amplification characteristic is modified in operation by adjustments and settings.

In order to measure the output of a video amplifier as it is employed in television film reading-devices and television cameras during the operation, the test signals, as is generally customary in television engineering, are fed in the form of test lines. These lines are introduced into the vertical gap of a video signal, applied to the input of an amplifier and evaluated at the output thereof by an oscillograph or lately by a computer. However, a meaningful evaluation is only possible if, e.g., the amplification of the amplifier does not change during a measuring process. A video amplifier with automatically regulated amplification would, however, continuously amplify the video signal and thus also the test signal of the test lines at amplification values varying, for example, from 1 to 5. Similar problems are also encountered in scattered-light correction.

Adjustments of aperture signals, gamma signals, black value signals, chromaticicity signals, and interfering signals are likewise carried out during the operation, but not frequently, whereas the automatic functions may vary continuously. In film-reading devices, the further problem of positive/negative switch occurs. In this case the test signal would be inverted at negative operation and thus the measurement would be totally upset.

At the present time the aforementioned problems are handled by not feeding the test signal to the input of a video amplifier, but, e.g., only after the 1:5 automatic-volume-control amplifier stage. Furthermore, the problems are met by modifying or pre-distorting the test signal in an additional amplifier in such a manner that the functions of the video amplifier are compensated, i.e., this additional amplifier is an attenuator with respect to the object of measurement itself. Moreover, by means of such devices, an already existing video amplifier can be connected to such a measuring system with test lines. Furthermore, attempts are being made to blank amplifier functions which disturb the measuring process.

All these aforementioned methods have the disavantage that portions or stages of a video amplifier are not controlled. The measuring signal is to measure the amplifier and not also the attenuator. The attenuator presents an additional expense and may be a source of errors just as the video amplifier itself. The blanking method presents the disadvantage that either the measuring signal is blanked along with the other signals or an interference pulse occurs which adulterates the black or white value of a video signal. At any rate, in the case of a blanking, the blanked circuit element is no longer included in the test.

SUMMARY OF THE INVENTION

The invention aims at avoiding the aforementioned drawbacks and at using a method by which an amplifier, particularly a video amplifier, can be measured throughout during the operation, from input to output, by means of measuring signals of the test lines. Moreover, a method is provided in which the development of devices for supporting television studio measuring technique by means of a computer was taken into account and not impeded.

The invention is characterized in that the amplifier, during the time of the passing of a test line, is switched to a predetermined, non-variable amplification characteristic, but after the passing of the test line is switched back to the normal, continuously adjustable, state of operation.

According to the invention, all amplifier functions which change or are modified at any time or during the operation are provided with a device by means of which they can be set to a 1:1 amplification or a neutral function, that is to say, to a neutral amplification characteristic. In such an amplifier which, for the duration of the passing of the test lines, is set to a 1:1 amplification or to a neutral function, the video signal passes through the prevailing amplifier functions unaltered and can therefore then be evaluated. In the simplest form this is accomplished by providing the amplifier with an adjustable input indicated by N which stands for "neutral." When a specific voltage, e.g., +5V, is fed to the adjustable input, the amplifier switches to the 1:1 amplification and shuts off the automatic amplification so that the signal passes through the amplifier unmodified.

The requirement of a quick resetting of the amplifier to a neutral amplification characteristic at the beginning of the passage of the test lines through the amplifier, excludes the use of relay contacts, but not of semiconductor switches. The use of semiconductor switches requires a specific potential relationship of the circuit, i.e., all switching processes must be directed suitably toward zero or toward a fixed potential.

For uncoupling these semiconductor switches 4*a* to 4*f*, which may be several hundred meters long, impedance converters, consisting of complementary transistors, are provided. By this impedance converter type which is employed in the circuit of the invention, the thermal voltage drift of the NPN type transistor is compensated by that of the PNP type transistor.

In order to prevent interfering voltages which may be caused by control lines 7*a* to 7*f* from reaching impedance converters 5*a* to 5*f*, each impedance converter is preceded by a low-pass filter respectively 6*a*, 6*b*, 6*c*, 6*d*, 6*e*, or 6*f* which in the simplest case consists essentially of an RC element.

The circuit elements 18*a* to 18*f* of the invention are d.c. coupled with relation to the function circuit proper, and all voltages relate to zero potential. Besides, all switch potentials fed to the adjustable inputs are equal, so that during the switching at the beginning of the passing of the test lines, no adulterating voltage jumps can occur in the vertical image gap of the video signal.

Since it is not always desirable to measure a video amplifier in the reset neutral modes of operation only, the system is expanded in such a way that at least two different circuit voltages N1 and N2 reset only the control devices and electronic switches that are required at the moment of the measurement. In order to test the function of individual control devices 1, 11 to 14 or of electronic switches 2, it is advisable to feed to each resetting system respectively 18*a*, 18*b*, 18*c*, 18*d*, 18*e* or 18*f* a separate resetting voltage at points 17*a* or respectively 17*b*, 17*c*, 17*d*, 17*e*, or 17*f*. The function testing of an individual control device or electronic switch takes place in this case in such a manner that, except for the control device to be tested, all control devices or electronic switches are reset and only the control device or electronic switch that was not reset is tested. It is furthermore provided that at least two control devices or electronic switches are combined into a group and are reset simultaneously by a resetting voltage, whereas another group of control devices or electronic switches is not reset.

This system provided by the invention, of resetting control devices or electronic switches of an amplifier, particularly a video amplifier, can also be operated by a computer, i.e., a computer feeds the resetting voltages necessary for the resetting to the switch or switches 4*a* to 4*f* which are to be reset. Besides, it is possible to evaluate by means of this computer the measuring signals of the test lines, or to indicate where in the video amplifier there are malfunctions.

DESCRIPTION OF THE PREFERRED EMBODIMENTS

Figure 1:
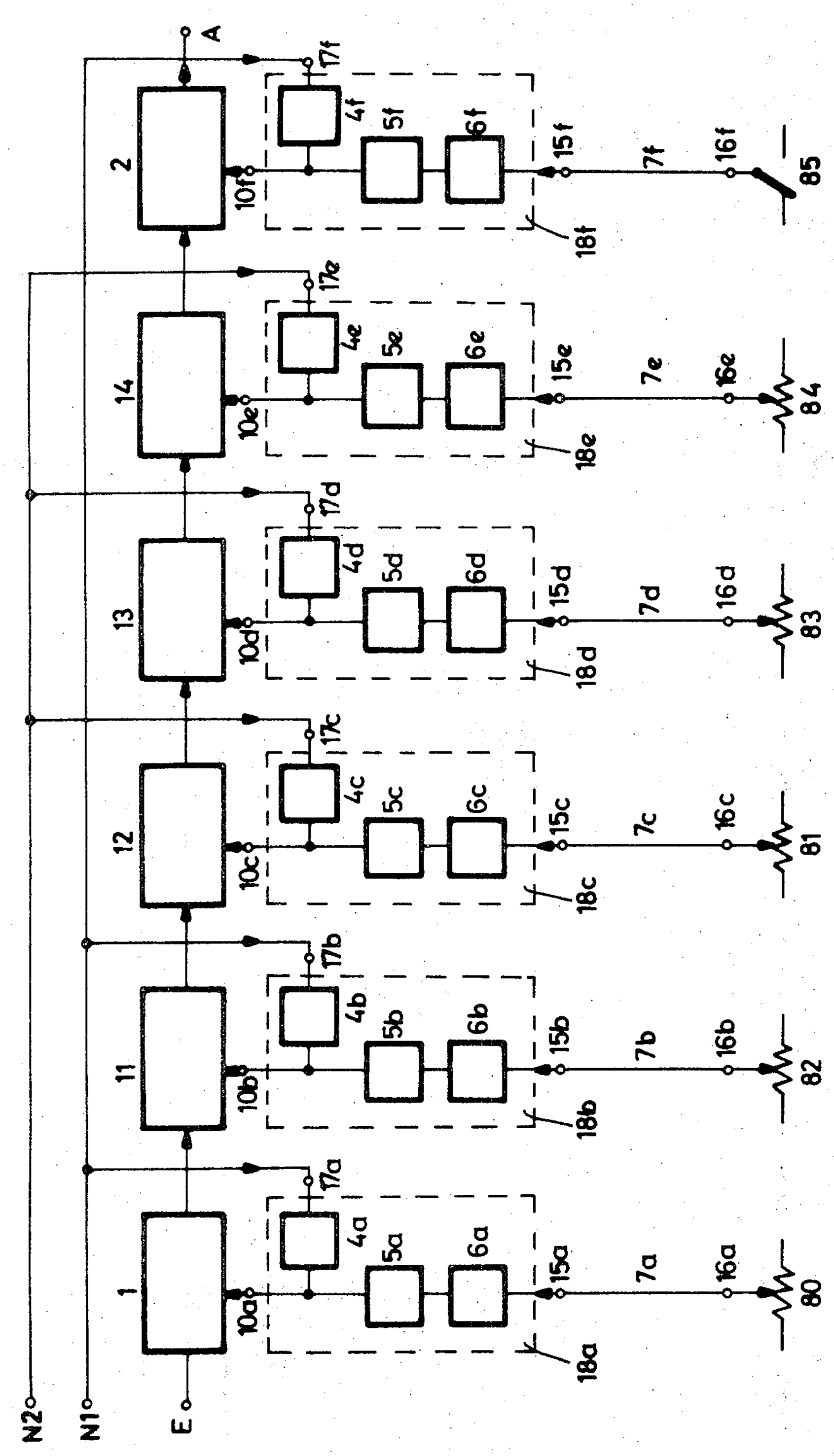
FIG. 1 is a block diagram of the system.

FIG. 1 shows the block diagram of a video amplifier with control devices 1, 11 to 14 and switches 2, as it is used in a film reading device. The video signal to be amplified is fed to input E and passes successively through control device 1, which carries out the amplication modification of, for example 1 to 5, the scattered light compensation 11, the black value control 12, the gamma control 13, the color adjustment control 14, and the positive/negative switch 2 with the amplifier output A. Potentiometers 80 to 84 represent the manually operable or automatic adjustment or control elements which make it possible to adjust steplessly the individual control amplifiers 1 and 11 to 14. By means of a switch 85, the electronic switch of positive/negative switching device 2 can be switched. The voltages tapped at potentiometer 80 to 84 and switch 85 are fed from points 16*a* to 16*f*, by way of control lines 7*a* to 7*f*, to points 15*a* to 15*f*. The control signals are fed from points 15*a* to 15*f* to the circuits of the invention 18*a* to 18*f*. In the circuits 18*a* to 18*f*, the control signal passes from points 15*a* to 15*f* first in each case through a respective low-pass filter 6*a*, 6*b*, 6*c*, 6*d*, 6*e* or 6*f*, which blocks the interfering voltage from control lines 7*a* to 7*f* and can only be passed by the pure d.c. voltage component. Impedance converters 5*a* to 5*f* uncouple control lines 7*a* to 7*f* as well as the low-pass filters from switches 4*a* to 4*f* and from control amplifiers 1 and 11 to 14 or, respectively, electronic switch 2, which elements are connected to the control voltage supply lines of points 10*a* to 10*f*. The resetting voltage is fed to switches 4*a* to 4*f* at points 17*a* to 17*f*. Depending on the decision as to which control amplifiers or switches are to be reset and which are not, amplification control 1, scattered light correction 11, and positive/negative switch 2 for instance are combined, to a group N1, and this group is reset simultaneously. The other amplification control devices are combined, e.g., to a group N2. This circuit arrangement makes it possible to reset *a*) only group N1; *b*) only group N2; and *c*) both groups N1 and N2 simultaneously. The more resetting groups (in an extreme case each amplification control device or each electronic switch has a separate resetting feed), the more precisely the video amplifier can be tested throughout.

Figure 2:
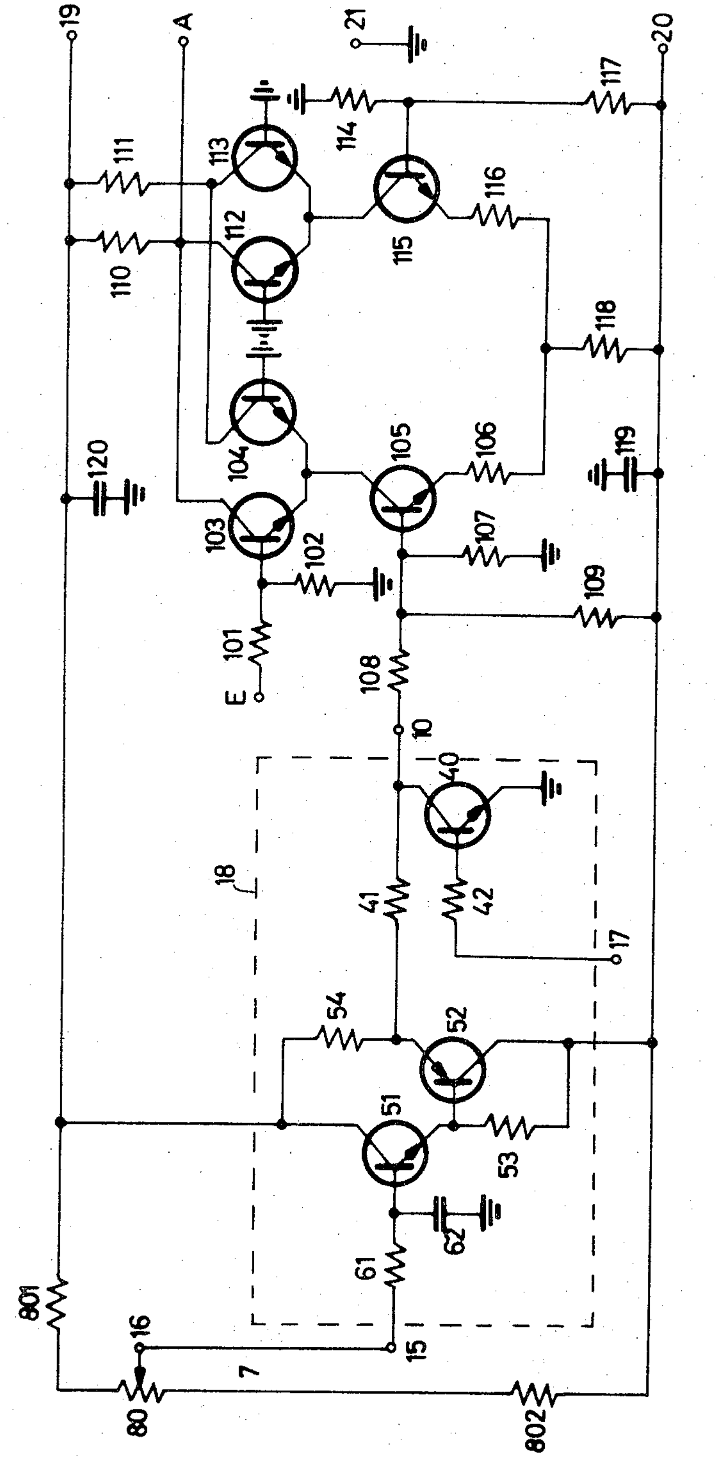
FIG. 2 is a diagram of an embodiment of a circuit according to the invention for amplifier control, color adjustment, etc. with the resetting feature.

Fig. 2 shows a customary circuit for amplification control, color adaptation control, etc., wherein the section 18 drawn in dash lines indicates the circuit arrangement of the invention. By way of terminal E, a clamped video signal biased to a specific voltage is fed by way of a voltage divider 101 and 102 to the base of a transistor 103, which constitutes a branch of a differential amplifier 103, 104. The base of transistor 104 is connected to ground 21. The emitters of transistors 103 and 104 are connected to the collector of a transistor 105 which represents a constant current source with the base voltage divider resistors 107 and 109 and the series-connected emitter resistors 106 and 118. The collector of transistor 103, which is connected to the collector of a transistor 112 and to a collector resistor 110, constitutes the output A of the video amplifier signal. Collector 104 is connected to a collector 113 and a collector resistor 111. Transistors 112, 113 and 115 serve only for the compensation of the additive component of the control portion and prevent signal jumps superimposed on the control. The bases of transistors 112 and 113 are connected to ground 21, and their emitters are connected to the collector of transistor 115. The base of transisotr 115 is connected to a voltage divider 114 and 117, and its emitter to resistor 116 which is connected to resistors 106 and 118. The control signal from potentiometer 80 consists of a control d.c. voltage, and is carried by way of a control line 7, which is connected at point 16 with the slider of potentiometer 80. Potentiometer 80 is limited as to its control range by resistors 801 and 802. The signal on control line 7 is connected to the input 15 of circuit 18 of the invention, where the control signal passes through a low-pass filter connected as an integrating element and consisting of a resistor 61 and a capacitor 62. From the integrator, the signal is fed to the base of transistor 51. Resistor 61 is positioned between input point 15 and the base of transistor 51, and capacitor 62 is positioned between the connection of resistor 61 to the base of transistor 51 and ground 21.

The circuit with transistors 51 and 52 represents an impedance converter stabilized with respect to temperature variations in such a way that NPN type transistor 52 compensates for the voltage as a function of temperature drift of NPN type transistor 51. The collector of transistor 51 is connected to a positive operating voltage 19 which is blocked off from mass 21 by a capacitor 120. The emitter of transistor 51 is connected to the base of transistor 52 and to an emitter resistor 53. The side of emitter resistor 53 which faces away from the emitter of transistor 51 and the collector of of transistor 52 are connected to the negative operating voltage 20 which is likewise isolated from ground 21 by a capacitor 119. The emitter of transistor 52 is connected to a resistor 54, connected in turn to positive operating voltage 19, as well as to a resistor 41 which in turn is connected to the collector of a transistor 40 at the output 10 thereof. The emitter of transistor 40 is connected to ground 21, and the base is connected via a resistor 42 to a resetting input 17. When a positive voltage is fed, by way of resistor 42, to resetting input 17 and thus to the base of transistor 40, transistor 40 opens and the collector potential assumes the emitter potential, i.e, the collector-emitter path acquires a low ohmic resistance and short-circuits the control signal from point 10 to the ground. A resistor 108, positioned between starting point 10 of the circuit 18 of the invention and the base of transistor 105 is connected by way of transistor 40 likewise to ground, i.e., resistors 108 and 107 are connected in parallel and thereby change the base voltage division ratio of transistor 105, which fact effects the required resetting of the amplification of the control amplifier.

Figure 3:
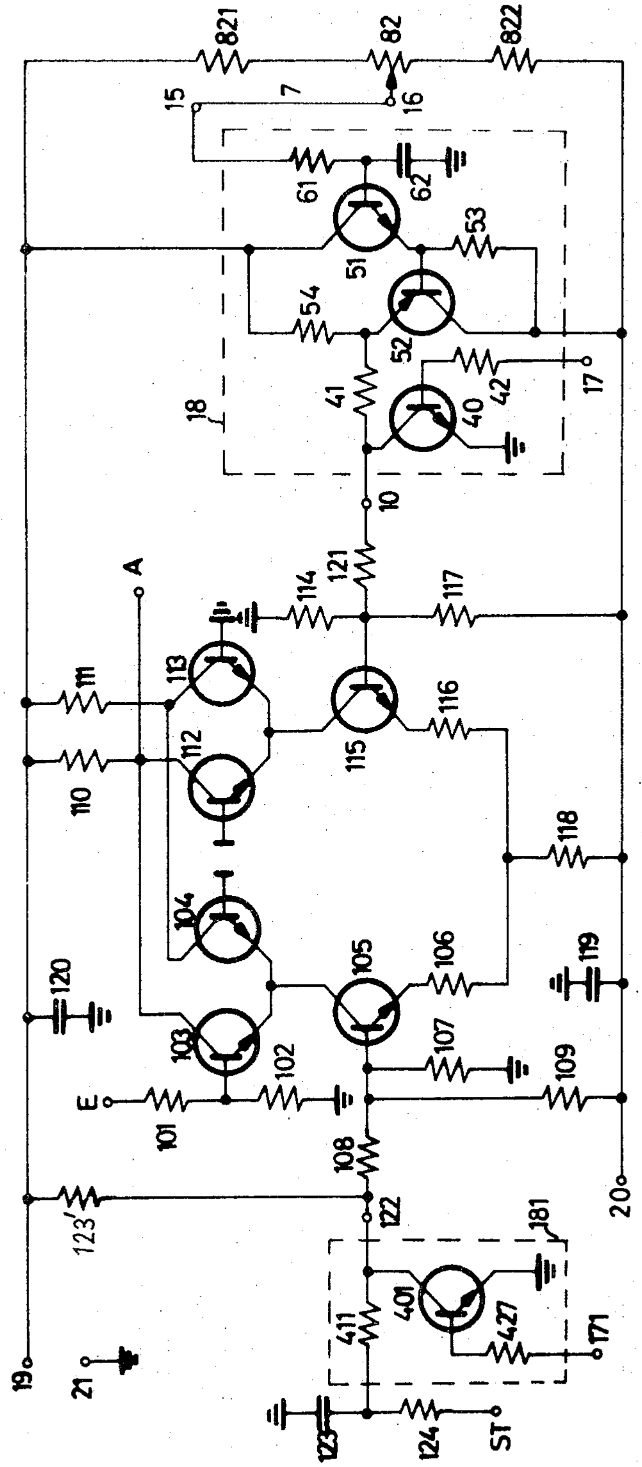
FIG. 3 is a diagram of an embodiment of the circuit for black value control and scattered light compensation with resetting.

FIG. 3 shows a circuit for controlling the black value with constant initial level and the scattered light compensation, in which circuit the electronic elements 101 to 102 form the same control amplifier circuit as those of FIG. 2. The positive and negative auxiliary pulses necessary for black-white coupling are for reasons of clarity shown outside the circuit marking lines. A plus 100 percent horizontal pulse is here fed to the video signal at input E in the horizontal blanking gap, and a negative 100 percent horizontal pulse to output A. Thus, when the amplification of the control circuit varies, a pulse is produced in the blanking gap whose peak value assumes a value which is constant with respect to the signal of the maximum value. From potentiometer 82, whose control range is limited by means of resistors 821 and 822 connected to the positive operating voltage 19 and the negative operating voltage 20, the control signal of the black value regulation is fed by way of control line 7 to point 15 of the circuit 15 of the invention already described in FIG. 2. By applying a positive voltage to a resetting input 17, transistor 40 assumes a low ohmic resistance and connects a resistor 121 parallel to resistor 114, which operation in turn changes the base voltage division ratio of transistor 115 and resets the control amplifier.

By way of input ST, a video signal whose black value is biased to zero potential, is fed, by way of a resistor 124, to a capacitor 123 which is connected to ground 21. Capacitor 123 forms an average value of the signal. The d.c. voltage thus obtained is fed by capacitor 123 to a resistor 411 which is connected to the collector of a transistor 401 and a point 122. By transistor 401 the emitter is connected to ground 21, and the base is connected via a resistor 421 to resetting input 171. Point 122 is also connected to resistor 123', which is connected to the positive operating voltage 19, and to a resistor 108, which is connected to the base of transistor 105. Circuit 181 represents a transistor switch for the resetting, which has the same function as the switch in circuit 18 with elements 40 to 42. Resistor 123' is of such magnitude that when no correction signal is connected to point 122, a voltage of zero volt is present.

Figure 4:
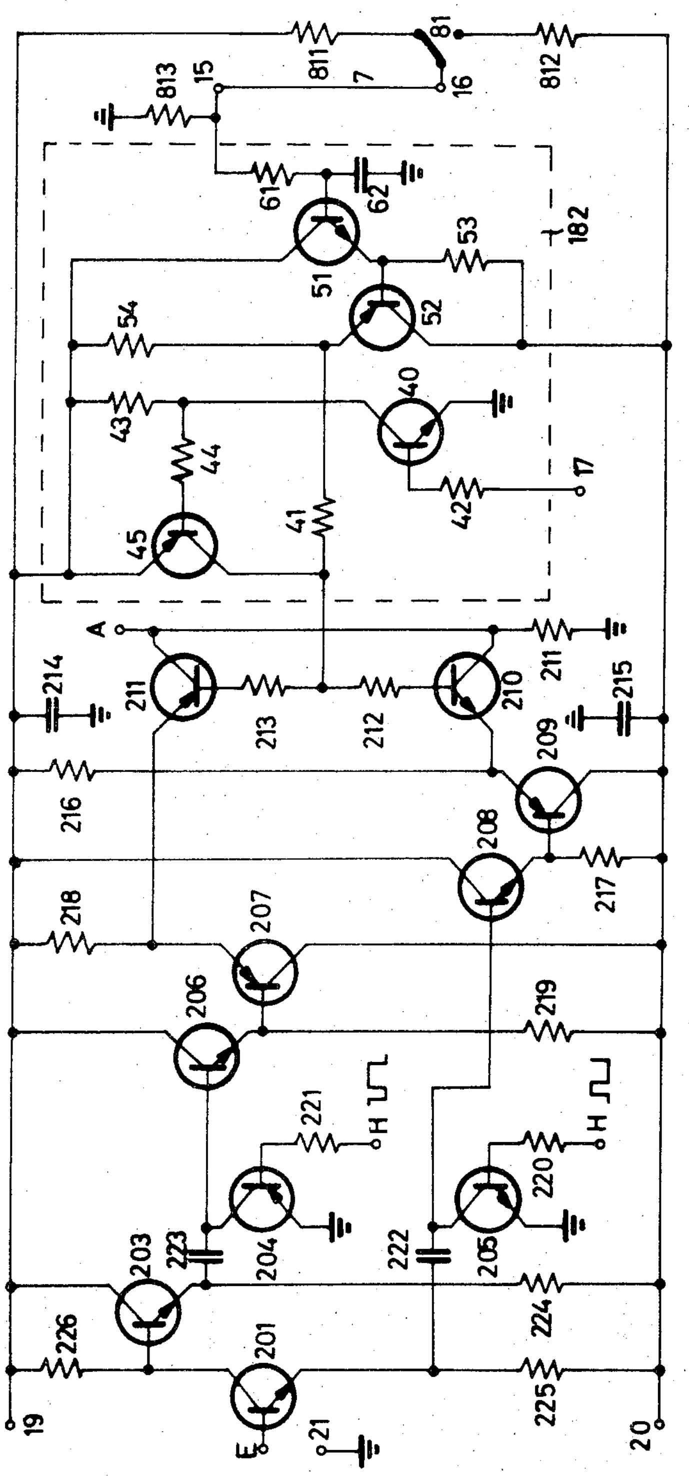
FIG. 4 is a diagram of an embodiment of a circuit for the positive/negative switch with the resettings.

FIG. 4 shows a customary positive/negative switch with the circuit 182 of the invention. By way of input E, a video signal is fed to the base of the reversal stage with a transistor 201. The collector of transistor 201 is connected to a resistor 226 which is connected to positive voltage 19 and to the base of an impedance converter transistor 203. The emitter of transistor 201 is connected, on the one hand, with resistor 225 connected to the negative voltage 20, and on the other hand, to a capacitor 222 provided with terminals While the collector of transistor 203 is connected to voltage 19, its emitter is connected to a resistor 224 which is connected to a resistor 224 positioned on the negative potential 20, and to a capacitor 223 provided with terminals. Due to the polarity change of the collector of a transistor 201, the positive video signal is connected to capacitor 222 provided with terminals, and the negative video signal to capacitor 223 likewise provided with terminals. The negative video signal is biased by means of a PNP type transistor 204 to whose base, negative biasing pulses of horizontal frequency are fed by way of a resistor 221. The positive video signal is biased by means of a NPN type transistor 205 to whose base positive biasing pulses of horizontal frequency are fed by way of a resistor 220. The two emitters of transistors 204 and 205 are connected to ground 21. The biasing of the signals is necessary so that at the switch of transistors 210 and 211, the same zero potentials prevail. The base of a transistor 206 is connected to a capacitor 223 and to the collector of a transistor 204. The circuit with transistors 206 (NPN type) and 207 (PNP type) is a two-stage impedance converter. The collector of transistor 206 and a resistor 218, whose other end is connected to the emitter of a transistor 207, is connected to the positive operating voltage 19. A resistor 219, one end of which is connected to the emitter of transistor 206 and to the base of transistor 207, is, like the collector of transistor 207, connected to the negative operating voltage 20. The circuit with transistors 208 (NPN type) and 209 (PNP type) constitutes likewise a two-stage impedance converter, in which the base of a transistor 208 is connected to the collector of a transistor 205 and the capacitor 222 provided with terminals. The collector of transistor 208 and a resistance 216, whose other end is connected with a transistor 209, is connected to the positive operating voltage 19, and a resistor 217, whose other end is connected to the emitter of transistor 208 and to the base of transistor 209, is connected to negative operating voltage 20. Transistors 211 (PNP type) and 210 (NPN type), with their circuit elements, are arranged in such a way as to form an electronic shifting switch. The negative video signal is supplied by way of the emitter of a transistor 207 to the emitter of a transistor 211 and the positive video signal by way of the emitter of a transistor 209 to the emitter of a transistor 210. The collectors of transistors 210 and 211 and resistor 211, connected to ground 21, are connected and form the output A of the video signal. Depending on the switch position of positive/negative switch 81, the positive operating voltage 19 on the one hand, and the negative operating voltage 20, on the other hand, are connected to point 16. From point 16 the signal is fed by way of control 7 to the input of the cicuit arrangement 182 and to point 15. Electric switch elements 61, 62, and 51 to 54 correspond in their effect and in their structure to the circuit 18 of FIG. 2. Transistors 40 (NPN type) and 45 (PNP type) operate as potential switches in such a way that when a positive resetting voltage is applied to 17 and thus by way of resistor 42 also to the base of transistor 40, the latter becomes conductive, i.e., of low ohmic resistance, and the collector which is connected to resistor 43 (whose other end is connected to 19) and resistor 44 assumes the potential of the emitter which is connected to ground 21. By way of resistor 44 the base of a transistor 45 is then also connected to the ground potential and opens a transistor 45, i.e., the collector now has the potential of the positive operating voltage 19. The collector of transistor 45 is connected to a resistor 41 which is connected to the emitter of a transistor 52, and to a resistor 213 which leads to the base of transistor 210. In a positive potential at the collector of transistor 45, transistor 210 opens and the positive video signal appears at output A, while transistor 211 at a positive base voltage, blocks and does not permit the negative video signal to pass. When no positive resetting voltage is applied to resetting input 17 and switch 81 is connected to negative operating voltage 20, a negative voltage passes by way of resistor 41 to the bases of transistors 210 and 211, which voltage has the effect that transistor 210 blocks and transistor 211 becomes conductive, and the negative video signal appears at output A. Resistors 811 to 813 divide the operating voltages 19 and 20 to a lower voltage value.

Figure 5:
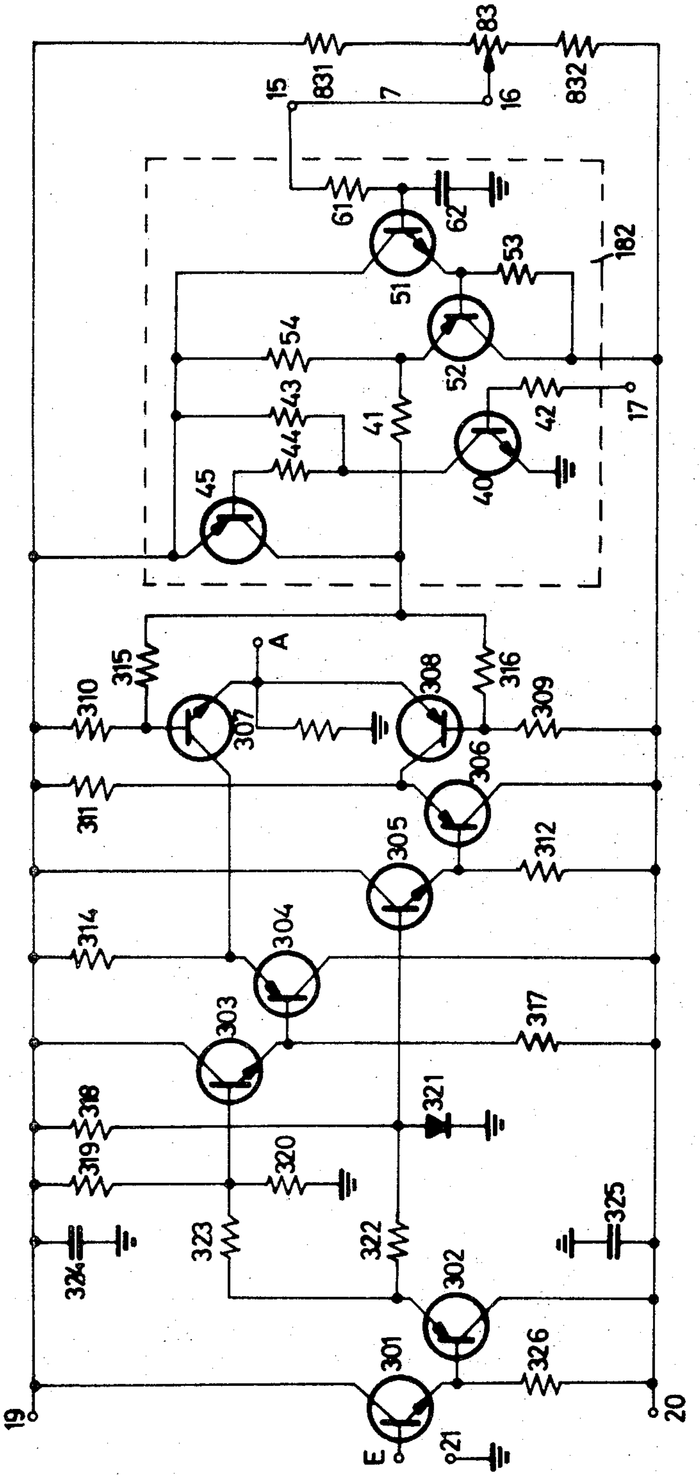
FIG. 5 is a diagram of an embodiment of a circuit for gamma control with the resetting.

FIG. 5 shows the circuit 182 of the invention in a circuit for gamma control. By way of input E a biased video signal is fed to the base of the impedance converter transistor 301 (NPN type) whose collector is connected to positive operating voltage 19 and whose emitter is connected to a resistor 326, the other end of which is connected to negative operating voltage 20, and further connected to the base of an impedance converter 302 (PNP type). The collector of transistor 302 is connected to negative operating voltage 21. From the emitter of transistor 302 the video signal is fed, on the one hand, to a linear voltage divider with resistors 323 and 320 and, on the other hand, to a nonlinear voltage divider, consisting of a resistor 322 and a diode 321. The video signal is then fed from the linear voltage divider to the base of transistor 303 (NPN type) which together with a transistor 304 (PNP type) represents again a two-stage impedance converter. A resistor 318, which is connected to resistors 323 and 320 and to the base of a transistor 303, fixes the working point of transistor 303. The collector of transistor 303 is connected to positive operating voltage 19, and the emitter, by way of a resistor 317, to the negative operating voltage 20. Besides, the emitter of transistor 303 is connected to the base of transistor 304 whose collector is connected to the negative operating voltage 20 and whose emitter is connected, by way of a resistor 314, to positive operating voltage 19. From the nonlinear voltage divider the video signal is likewise fed to a two-stage impedance converter with transistors 305 (NPN type) and 306 (PNP type). The base of transistor 305 is connected to a diode 312, a resistor 322, and a resistor 318 whose other end is connected to positive operating voltage 19. The collector of transistor 305 is connected to positive operating voltage 19, and the emitter, by way of a resistor 312 to the negative operating voltage 20. The video signal is conveyed from emitter of the transistor 305 to the base of a transistor 306 whose collector is connected to the negative operating voltage 20, and whose emitter is connected, by way of a resistor 311, to the positive operating voltage. The collector of a transistor 307 is controlled by the emitter of a transistor 304 with the linear video signals, and the collector of a transistor 308 by the emitter of transistor 306. Transistors 307 (NPN type) and 308 (PNP type) form, together with their resistors 339, 310, 313, 315, and 316 an excess aperature adjustment device. The emitter of transistors 307 and 308 are connected to a resistor 313 which is connected to ground, and represent the output A of the video signal. The base of transistor 307 is positively biased by way of resistor 310 and the positive operating voltage 19, and is fed by way of resistor 315. The base of transistor 308 is negatively biased by way of a transistor 308 and of the negative operating voltage 20, and is fed by way of resistor 316, connected with resistor 315. From the slide of a potentiometer 83, whose control range is limited by means of resistors 831 and 832, the control voltage is tapped and fed, from point 16, by way of a control line 7, to the input 15 of the circuit 182 of the invention, already described in FIG. 4. When a positive voltage is fed to resetting input 17, the collector of a transistor 45 becomes positive and transistor 307 becomes conductive so that only the linear video signal reaches output A since transistor 308 blocks. In operating condition, i.e., when no positive voltage is applied to resetting input 17, a positive or negative voltage, depending on the slider position of potentiometer 83, is fed, by way of resistor 41, simultaneously to the bases of transistors 307 and 308 which then open and close correspondingly and set at output A a linear or non-linear video signal value.

What is claimed is:

1. A method of measuring test signals passing through an amplifier having several series-connected stages, each stage having various amplification characteristics which are varied during operation comprising the steps of:

A. operating the amplifier during periodic intervals so that at least some of said amplification characteristics are maintained at a constant value during periodic intervals, B. passing the test signals through the amplifier during said periodic intervals to generate output signals from the amplifier, C. measuring the output signals from the amplifier during the periodic intervals, and D. operating the amplifier outside the periodic intervals to allow the amplification characteristics to be varied.

2. A method according to claim 1 wherein the amplifier is a video amplifier and the periodic intervals are the video blanking intervals of a video signal carried by the amplifier.

3. A method according to claim 2 wherein the amplifier is a multistage amplifier, and wherein all stages (1,2, and 11 to 14) of the amplifier are switched to a constant amplification characteristic during a blanking interval.

4. A method according to claim 2 wherein the amplifier is a multistage amplifier, and wherein only one stage (1, 2, 11, 12, 13 or 14) of the amplifier is switched to a constant amplification characteristic during a blanking interval.

5. A method according to claim 2 wherein the amplifier is a multistage amplifier, and wherein all but one stage is switched to a constant amplification characteristic during a blanking interval.

6. A method according to claim 2 wherein the amplifier is a multistage amplifier, and wherein, during successive blanking intervals, the stages are respectively and sequentially switched to a constant amplification characteristic.

7. A circuit for measuring test signals passing through an amplifier having an input terminal and several series-connected stages, each stage having various amplification characteristics which are varied during operation comprising:

A. a plurality of control lines for feeding a corresponding plurality of control signals to the various stages of the amplifier, wherein the control signals control the variation of respective amplification characteristics of the amplifier,
B. a corresponding plurality of switches connected in the respective control lines,
C. means for operating selected said switches during periodic intervals and not outside said intervals,
D. and means for feeding at test signal to the input terminal of the amplifier during the periodic intervals and measuring an output signal which comes from the amplifier during the intervals.

8. A circuit according to claim 7 wherein the amplifier is a video amplifier and the periodic intervals are the video blanking intervals of a video signal carried by the amplifier.

9. A circuit according to claim 8 further comprising a plurality of impedance converters connected in corresponding control lines before the respective switches.

10. A circuit according to claim 9 wherein the impedance converters are low-pass filter.

11. A circuit according to claim 10 wherein the switches are controlled by pulses timed by the blanking interval.

* * * * *

PO-1050
(5/69)

UNITED STATES PATENT OFFICE
CERTIFICATE OF CORRECTION

Patent No. 3,836,860 Dated September 17, 1974

Inventor(s) HANS HORNEFF

It is certified that error appears in the above-identified patent and that said Letters Patent are hereby corrected as shown below:

Insert: [30] Foreign Application Priority Data

May 21, 1971 Germany P2125223

Column 4, line 38, correct the spelling of "transistor".

Signed and sealed this 26th day of November 1974.

(SEAL)
Attest:

McCOY M. GIBSON JR.
Attesting Officer

C. MARSHALL DANN
Commissioner of Patents